United States Patent [19]

Nguyen et al.

[11] Patent Number: 5,058,822
[45] Date of Patent: Oct. 22, 1991

[54] TAKEUP REEL POSITIONING APPARATUS FOR TAPE THREADING IN A TAPE DRIVE SYSTEM

[75] Inventors: Thai Nguyen, Thornton; George Reichenberg, Lafayette, both of Colo.

[73] Assignee: Storage Technology Corporation, Louisville, Colo.

[21] Appl. No.: 573,079

[22] Filed: Aug. 24, 1990

[51] Int. Cl.⁵ ............................................. G11B 15/32
[52] U.S. Cl. ..................................... 242/195; 242/57; 250/231.13
[58] Field of Search ............... 242/195, 57, 188, 78.3; 250/231.13

[56] References Cited

U.S. PATENT DOCUMENTS

| | | | |
|---|---|---|---|
| 4,091,426 | 5/1978 | Umeda | 242/188 |
| 4,343,024 | 8/1982 | Kawai | 242/188 |
| 4,577,811 | 3/1986 | Bray et al. | 242/195 |
| 4,742,406 | 5/1988 | Turuda | 242/57 |
| 4,776,528 | 10/1988 | West | 242/195 |
| 4,852,825 | 8/1989 | McGee, et al. | 242/195 |

FOREIGN PATENT DOCUMENTS 2353823  5/1974 Fed. Rep. of Germany ...... 242/195

Primary Examiner—Daniel P. Stodola
Assistant Examiner—John Q. Nguyen
Attorney, Agent, or Firm—Dorr, Carson, Sloan & Peterson

[57] ABSTRACT

The takeup reel positioning apparatus for the tape threading operation in a magnetic tape drive functions to precisely locate the takeup reel slot at the end of the tape threading path in order to enable the tape threading arm to load the leader block therein. This precise positioning is accomplished by the use of a disk that is fixedly attached to the takeup reel motor shaft. An interrupter is provided whose beam transverses the disk in the region of an annular ring thereon thereby indicating the presence of a transparent or opaque portion thereof. A selected boundary between the opaque and transparent portions of the annular ring is in the path of the beam of the interrupter at precisely the same time that the takeup reel slot is positioned at the end of the tape threading path. The interrupter is used to cause the takeup reel motor to oscillate around this predetermined position to automatically compensate for any mispositioning caused by inaccuracies in the appartus.

7 Claims, 2 Drawing Sheets

TAKEUP REEL POSITIONING APPARATUS FOR TAPE THREADING IN A TAPE DRIVE SYSTEM

FIELD OF THE INVENTION

This invention relates to tape drives and in particular to apparatus for precisely controlling the position of the takeup reel in order to enable the tape threading arm to insert a leader block therein during the tape threading operation.

PROBLEM

It is a problem in the field of magnetic tape drives to accurately position the takeup reel, which contains a slot therein to receive a leader block which is located on the end of the magnetic tape, as inserted therein by the tape threading arm. In tape drives designed to handle 3480 type magnetic tape cartridges, a tape threading arm is used to automatically thread the tape from the magnetic tape cartridge onto the takeup reel along a predefined tape transport path. The 3480 type magnetic tape cartridge includes a leader block attached to one end of the tape contained therein. The tape threading arm of the tape drive functions to grasp the leader block and transport it along with the magnetic tape attached thereto along a tape threading path over the read/write heads and to the takeup reel. The takeup reel includes a slot designed to accept the leader block which is inserted therein by the tape threading arm. It is obvious that the slot on the takeup reel must be identically positioned at the end of the tape threading path in order for the tape threading arm to precisely insert the leader block therein.

There are a number of control arrangements in the prior art to accomplish this function and typically entail precisely stopping the takeup reel at the predefined position. The difficulty with this arrangement is that any inaccuracy in the positioning of the takeup reel results in a misalignment of the takeup reel slot with the end of the tape threading path and the corresponding inability of the tape threading arm to precisely place the leader block in the slot. This misalignment causes the tape threading arm to force the takeup reel to rotate in either direction in order to accept the leader block. However, this forceful insertion of the leader block into the slot on the takeup reel causes excessive wear on both the leader block and the takeup reel slot and, if the misalignment is significant enough, the tape threading arm fails to insert the leader block in the slot on the takeup reel.

SOLUTION

The above described problems are solved and a technical advance achieved in the field by the takeup reel positioning apparatus of the present invention which functions to position the slot of the takeup reel at the end of the tape threading path and which also causes the takeup reel to dither at that location in order to automatically compensate for any misalignment between the slot on the takeup reel and the tape threading arm. The takeup reel motor is controlled by a processor which produces both takeup reel rotation direction control signals and takeup reel rate of rotation control signals which signals are used by an associated takeup reel motor winding driver circuit to control the rotation of the takeup reel. These control signals are generated by the processor and can be used to precisely control the rotation of the takeup reel. The takeup reel motor rotation direction control signal consists of a binary signal wherein for example a one state indicates clockwise rotation while a zero state indicates counterclockwise rotation for the takeup reel. The takeup reel motor rate of rotation control signals consist of a series of pulses the width of which determines the rate of rotation of the takeup reel.

The control apparatus of the present invention functions to identify the nominal desired position of the slot on the takeup reel and then dither the takeup reel around this predetermined position. This is accomplished by the use of a disk fixably attached to the drive shaft of the takeup reel motor, which disk includes an annular ring thereon, a segment of which is transparent to light and the remainder of which is opaque to light. An interrupter circuit having a transmitter and receiver is positioned such that the light beam extending from the transmitter to the receiver is parallel to the drive shaft of the takeup reel motor and the annular ring on the disk functions to interrupt the transmitted light beam. Therefore, the interrupter circuit senses the presence of the opaque section of the annular ring on the disk by the interruption of the light beam transmitted from the transmitter to the receiver of the interrupter circuit. The opaque section of the annular ring is configured such that a selected one of the boundaries between the opaque and the transparent section of the annular ring, when placed in the path of the light beam, corresponds to the exact positioning of the slot in the takeup reel at the end of the tape threading path. Logic circuitry is provided to respond to the presence of this boundary to cause the tape reel motor to cycle back and forth, from direction to direction, as this selected boundary is crossed. In particular, when the interrupter circuit detects the presence of the opaque area of the annular ring, it intercepts the direction control signal from the processor and instead reverses the direction of rotation of the takeup reel motor. The processor transmits takeup reel motor rate of rotation control signals that cause a very slow rate of rotation of the takeup reel in order to slowly dither the takeup reel back and forth around the predetermined position. The interrupter circuit responds to the transition from the opaque area to the transparent area of the annular ring by again reversing the direction of rotation of the takeup reel motor to thereby cause the takeup reel motor to change direction of rotation as it slowly moves back and forth around the desired predetermined position, which cycling and predetermined position are identified by the location of the boundary between the opaque and transparent areas of the annular ring of the disk affixed to the drive shaft of the takeup reel motor. Therefore, this apparatus not only precisely locates the slot at the end of the tape threading path but also dithers the slot back and forth to insure that positioning inaccuracies of the takeup reel slot are compensated for in an automatic and dynamic manner.

DETAILED DESCRIPTION

Figure 1:
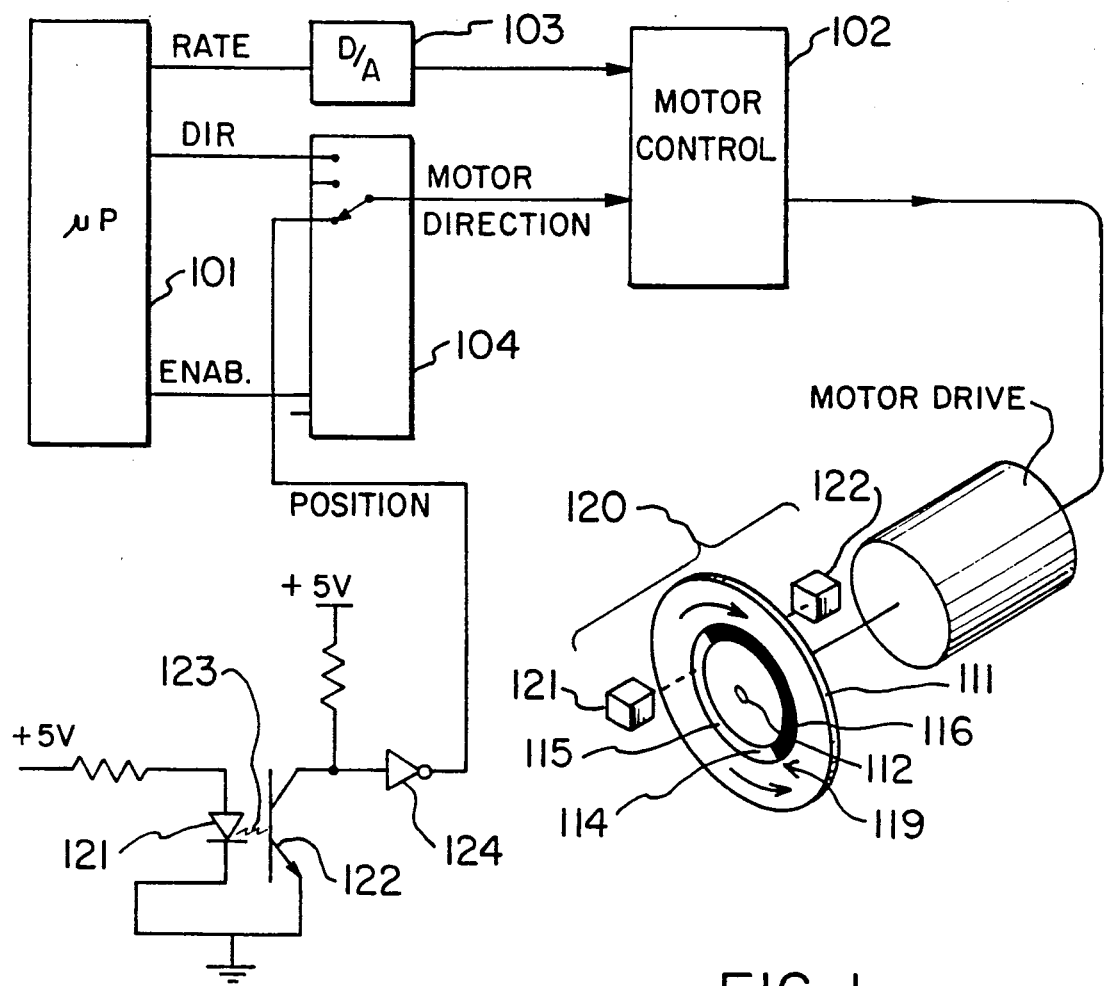
FIG. 1 illustrates in block diagram form the architecture of the takeup reel positioning apparatus.

FIG. 1 illustrates in block diagram form the overall architecture of the takeup reel positioning apparatus of the present invention. In particular, a processor 101 generates two sets of control signals to thereby regulate the rotation of a takeup reel (not shown). The takeup reel is connected to a takeup reel motor drive shaft 112 which is an integral part of takeup reel motor 113. The control signals produced by processor 101 consist of a takeup reel motor direction control signal DIR and a takeup reel motor rate of rotation control signal RATE. A takeup reel motor winding drive circuit 102 is used to convert the signals received from processor 101 into the actual drive signals applied to the motor windings of takeup reel drive motor 113 to cause the rotation of takeup reel drive shaft 112. A digital to analog converter circuit 103 is interposed between the output of processor 101 and takeup reel motor winding drive circuit 102 to convert the series of pulses output by processor 101 into a corresponding analog signal which is used by takeup reel motor winding drive circuit 102 to apply a current of magnitude determined by the analog signal received from digital analog converter 103 into the windings of takeup reel motor 113.

Figure 2:
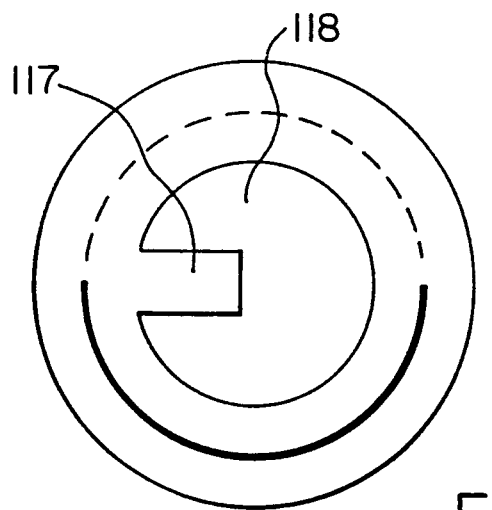
FIG. 2 illustrates a top view of the disk mounted on the takeup reel drive motor shaft.
Figure 3:
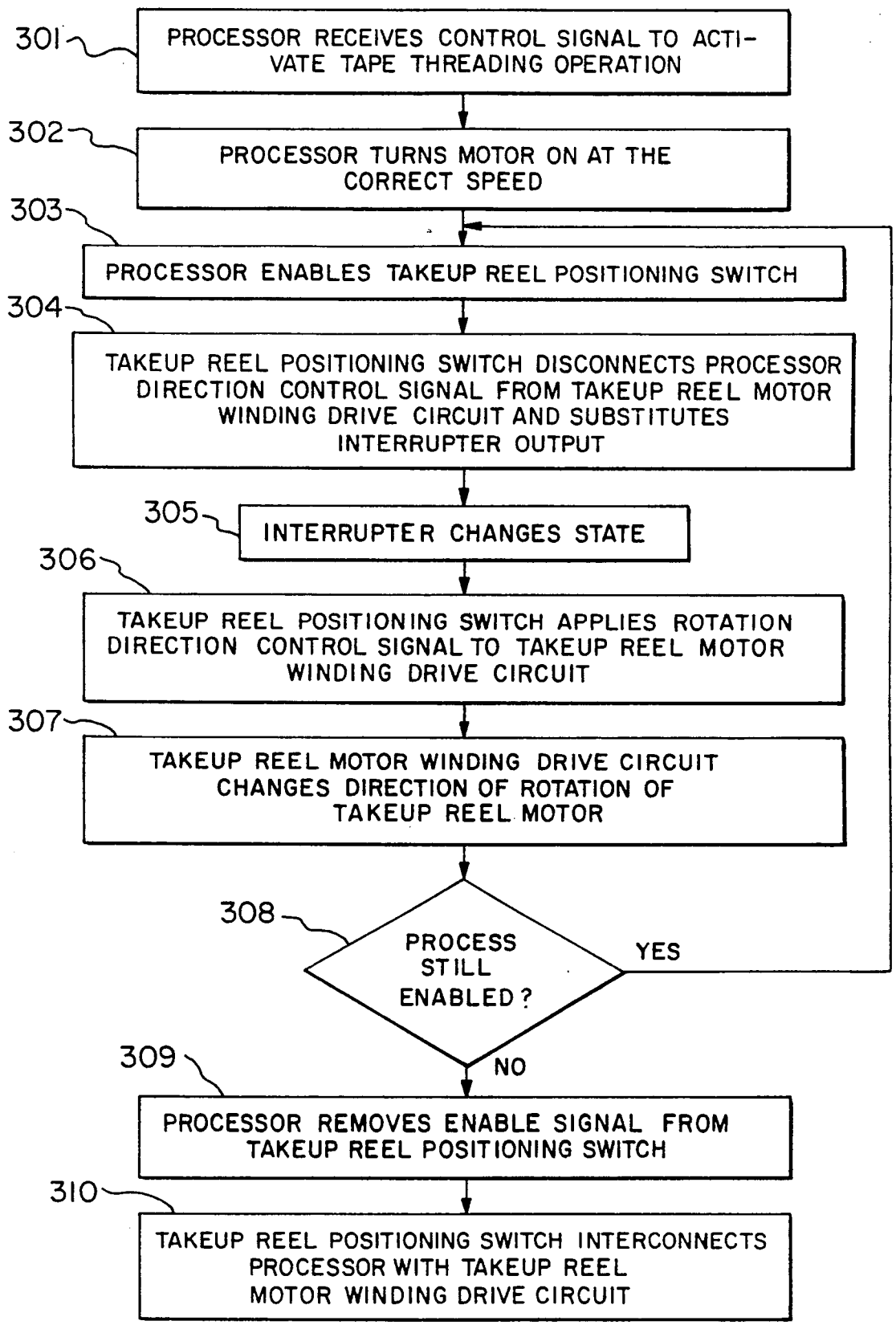
FIG. 3 illustrates in flow diagram form the operational steps taken by the takeup reel positioning apparatus to position the takeup reel slot at the end of the tape threading path.

As shown in FIGS. 1 and 2, a code disk 111 is attached to the takeup reel motor shaft 112 to operate as a rotating shutter to alternately block or allow the transmission of a beam. This is accomplished by providing an annular ring 114 on disk 111 which annular ring 114 includes a segment 115 that is transparent to the beam being transmitted and a segment 116 that is opaque to the beam being transmitted. The beam is produced by an optical interrupter 120 which is attached typically to the case of takeup reel motor 113 to operate as the transmitter and receiver of the beam. For example, the transmitter 121 can be a light emitting diode while the receiver 122 can be an optical sensor which detects the presence of the beam 123 that is produced by transmitter 121. The disk 111 is attached to the takeup reel motor shaft 112 in a fixed relationship using for example a tab 117 that fits into a corresponding notch 118 in the takeup reel motor shaft 112. The orientation of the tab 117 and notch 118 is such that the slot on the takeup reel used to receive the leader block is positioned exactly at the end of the tape threading path when a selected one 119 of the boundaries between the opaque 116 and transparent 115 segments of the annular ring 114 is located in the path of beam 123. The flow chart of FIG. 3 illustrates in step by step form how the apparatus operates in order to precisely position the slot in the takeup reel at the end of the tape threading path. Processor 101 responds to the control signals indicating the initiation of a tape threading operation (301) by transmitting a series of pulses on output lead RATE to digital to analog converter 103 that cause the takeup reel motor winding drive circuit 102 to activate motor 113 to rotate at a slow rate of speed (302). The slow rotation of takeup reel motor shaft 112 causes disk 111 to move at a very slow angular rate of speed. Processor 101 responds to control signals indicating the initiation of a tape threading operation by transmitting (303) a control signal on lead ENAPOS to positioning mode switch 104 which is interposed between processor 101 and takeup reel motor winding drive circuit 102. Positioning mode switch 104 disconnects (304) lead DIR from the takeup reel motor winding drive circuit 102 and, instead, interconnects the interrupter 120 in its place. Interrupter 120, as noted above, includes transmitter 121 and receiver 122 that produce a beam 123 that extends therebetween. Assume for the purpose of discussion, that disk 111 is rotating in the clockwise direction in FIG. 1 and the beam from transmitter 121 is blocked by the opaque section 116 of annular ring 114. In that case, receiver 122 is in an off condition which causes a high input to be applied to invertor circuit 124 causing it to place a logic low signal on its output lead POSITION through positioning mode switch 104 to takeup reel motor winding drive circuit 102. This low signal on lead POSITION causes the motor shaft 112 to continue its rotation in a clockwise direction until the boundary 119 or the annular ring is reached. At this point, the transparent section 115 of annular ring 114 enables beam 123 to pass to the receiver 122 causing it to turn on changing the status of lead POSITION to a logic high (305). Takeup reel positioning switch 104 applies (306) this new rotation direction control signal to the takeup reel motor winding drive circuit 102. At this juncture, takeup reel motor winding drive circuit 102 is activated (307) by the change in logic signal on lead POSITION to reverse the direction of the motor rotation to thereby cause the takeup reel to rotate in a counterclockwise direction to return the boundary 119 on annular ring 114 to a position in front of beam 123. At step 308, the process returns to step 303 as long as the tape threading activation control signal is present.

Therefore, every time the rotation of disk 111 causes boundary 119 to transverse beam 123, causing a change in state in lead POSITION, the takeup reel motor winding drive circuit 102 changes the direction of rotation of the takeup reel. Since the rotation of the takeup reel is at a low rate of speed, such change in direction causes the slot to dither back and forth a small distance around the predetermined position at the end of the tape threading path. Therefore, if the positioning of the slot at the end of the tape threading path is inaccurate for any reason the dithering caused by this circuit automatically compensates for this misalignment and enables the tape threading arm to insert the leader block in the slot in the takeup reel without forcibly fitting the leader block therein.

Once the leader block is placed in the slot in the takeup reel, the load placed on the takeup reel by the tape threading arm causes the dithering action to cease since the stall current in the motor has been exceeded. Once the tape threading arm has completed its operation and the tape threading activation control signal is removed (308), processor 101 returns to normal tape read/write activity and disables positioning switch 104 by removing (309) the enable signal on lead ENAPOS. Interrupter 120 and disk 111 continue their operation as disk 111 is rotated in the normal operation of the takeup reel motor shaft 112 but the output on lead POSITION from interrupter 120 is disconnected (310) from the takeup reel motor winding drive circuit 102 and performs no function for the remainder of the operation of the tape drive. Thus, this simple apparatus not only enables very accurate positioning of the takeup reel slot at the end of the threading path but also provides a certain amount of dither around that preferred position to automatically compensate for any misalignment or inaccuracies in the positioning of the takeup reel slot.

While a specific embodiment of this invention has been disclosed, it is expected that those skilled in the art can and will design alternate embodiments of this invention that fall within the scope of the appended claims.

We claim:

1. In a tape drive having a tape threading arm for threading a leader block attached to one end of a magnetic tape mounted on said tape drive into a slot on a take-up reel which is driven by a take-up reel motor, where a processor transmits both take-up reel motor shaft rotation direction control signals and take-up reel motor shaft rate of rotation control signals to a take-up reel motor winding drive system, which includes an apparatus for positioning said take-up reel motor shaft in a predetermined rotational position and for oscillating said take-up reel motor shaft around said rotational position to facilitate threading said leader block into said slot, comprising:

means for regulating the direction and rate of rotation of said motor shaft;

interrupter means, having a transmitter and a receiver, for producing a beam extending therebetween, which beam is substantially parallel to said take-up reel motor shaft and located in proximity thereto;

a disk connected to said motor shaft, having an axis aligned with the axis of said take-up reel motor shaft and rotating in synchronization therewith, said disk positioned to bisect said transmitted beam and including an annular ring thereon, one segment of which is transmissive of said beam and the remainder of said annular ring is not transmissive of said beam where the boundary between said transmissive and not transmissive segments, when located in the path of said beam, positions said slot opposite said tape threading arm to receive said leader block;

disk position control means connected to said interrupter means and responsive to a disk position activation signal indicative of the substantial cessation of rotation of said motor shaft for positioning said boundary of said annular ring in said beam, including:

means responsive to said annular ring interrupting said beam for activating said regulating means to reverse the direction of rotation of said take-up reel motor shaft, and means connected to said interrupter means and responsive to said annular ring no longer interrupting said beam for activating said regulating means to reverse the direction of rotation of said take-up reel motor shaft, such that said slot oscillates around said predetermined position to facilitate said tape threading arm loading said leader block into said slot.

2. The apparatus of claim 1 wherein said interrupter means includes:

optical sensor means, having a light source and a light detector for producing a light beam extending therebetween.

3. The apparatus of claim 1 further comprising:

means responsive to said disk position activation signal for reducing said rate of rotation of said motor shaft to a predetermined minimum value.

4. In a tape drive having a tape threading arm for threading a leader block attached to one end of a magnetic tape mounted on said tape drive into a take-up reel which is driven by a take-up reel motor, for threading said leader block into a slot located in said take-up reel and a processor controlled motor winding drive circuit where a processor transmits both motor shaft rotation direction control signals and motor shaft rate of rotation control signals to a take-up reel motor winding drive system, which includes an apparatus for positioning said take-up reel motor shaft in a predetermined rotational position and for oscillating said take-up reel motor shaft around said predetermined rotational position to facilitate threading said leader block into said slot, comprising:

means for regulating the direction and rate of rotation of said motor shaft;

interrupter means, having a transmitter and a receiver for producing a beam extending therebetween, which beam is substantially parallel to said take-up reel motor shaft and located in proximity thereto;

a disk connected to said take-up reel motor shaft, having an axis aligned with the axis of said take-up reel motor shaft, and rotating in synchronization therewith, said disk positioned to bisect said transmitted beam and including an annular ring thereon, one segment of which is transmissive of said beam and the remainder of said annular ring is not transmissive of said beam where the boundary between said transmissive and not transmissive segments, when located in the path of said beam, positions said slot opposite said tape threading arm to receive said leader block;

disk position control means interposed between said processor and said motor winding drive circuit and responsive to a disk position activation signal from said processor indicative of the substantial cessation of rotation of said motor shaft for positioning said boundary in said beam, said disk position control means including:

means responsive to said disk position activation signal for blocking the transmission of said motor shaft rotation direction control signals from said processor to said take-up reel motor winding drive circuit to prevent said processor from interfering with said disk position control means regulating the operation of said take-up reel motor, means responsive to said annular ring interrupting said beam for transmitting a first control signal to said motor winding drive circuit to reverse the direction of rotation of said motor shaft, and means connected to said interrupter means and responsive to said annular ring no longer interrupting said beam for transmitting a second control signal to said motor winding drive circuit to reverse the direction of rotation of said motor shaft, to thereby oscillate said slot around said rotational position opposite said tape threading arm to receive said leader block.

5. The apparatus of claim 4 wherein said interrupter means includes:

optical sensor means, having a light source and a light detector for producing a light beam extending therebetween.

6. The apparatus of claim 4 further comprising:

means responsive to said disk position activation signal for reducing said rate of rotation of said motor shaft to a predetermined minimum value.

7. In a tape drive having a tape threading arm for threading a leader block attached to one end of a magnetic tape mounted on said tape drive into a take-up reel which is driven by a take-up reel motor and a processor controlled motor winding drive circuit for controlling the rotation of said take-up reel motor where a processor transmits both take-up reel motor shaft rotation direction control signals and take-up reel motor shaft rate of rotation control signals to a take-up reel motor winding drive system, an apparatus for positioning said take-up reel motor shaft in a predetermined rotational position and for oscillating said take-up reel motor shaft around said predetermined rotational position to facilitate the threading of said leader block into a slot located in said take-up reel, comprising: interrupter means, having a transmitter and a receiver for producing a beam extending therebetween, which beam is substantially parallel to said take-up reel motor shaft and located in proximity thereto;

a disk connected to said take-up reel motor shaft, having an axis aligned with the axis of said take-up reel motor shaft and rotating in synchronization therewith, said disk positioned to bisect said transmitted beam and including an annular ring on said disk, one segment of said annular ring being transmissive of said beam and the remainder of said annular ring being not transmissive of said beam such that when the boundary of said annular ring, where said annular ring changes from transmissive to not transmissive is in the path of said beam, said slot is positioned opposite said tape threading arm to receive said leader block;

disk position control means interposed between said processor and said takeup reel motor winding drive circuit and responsive to a disk position activation signal from said processor indicative of the substantial cessation of rotation of said motor shaft for positioning said boundary of said annular ring in said beam, said disk position control means including:

means responsive to said disk position activation signal for blocking the transmission of said take-up reel motor shaft rotation direction control signals from said processor to said take-up reel motor winding drive circuit to prevent said processor from interfering with said disk position control means regulating the operation of said take-up reel motor, and means connected to said interrupter means and responsive to a change from reception to non-reception of said beam and from non-reception to reception of said beam by said receiver for transmitting control signals to said take-up reel motor winding drive circuit to reverse the direction of rotation of said take-up reel motor shaft, such that said slot oscillates around said predetermined rotational position opposite said tape threading arm to receive said leader block.

* * * * *